(12) United States Patent
Lee

(10) Patent No.: US 11,682,304 B2
(45) Date of Patent: Jun. 20, 2023

(54) DRIVER ASSISTANCE SYSTEM AND CONTROL METHOD FOR THE SAME

(71) Applicant: MANDO CORPORATION, Pyeongtaek-si (KR)

(72) Inventor: Jaehwan Lee, Gwangju-si (KR)

(73) Assignee: HL Klemove Corp., Incheon (KR)

( * ) Notice: Subject to any disclaimer, the term of this patent is extended or adjusted under 35 U.S.C. 154(b) by 183 days.

(21) Appl. No.: 17/220,133

(22) Filed: Apr. 1, 2021

(65) Prior Publication Data

US 2021/0343148 A1 Nov. 4, 2021

(30) Foreign Application Priority Data

Apr. 3, 2020 (KR) .......................... 10-2020-0040999

(51) Int. Cl.
 *G08G 1/16* (2006.01)
 *B60W 30/095* (2012.01)
 (Continued)

(52) U.S. Cl.
 CPC ............. *G08G 1/161* (2013.01); *B60W 10/20* (2013.01); *B60W 30/09* (2013.01);
 (Continued)

(58) Field of Classification Search
 CPC ......... G08G 1/161; H04W 4/46; G06V 20/58; B60W 10/20; B60W 30/09;
 (Continued)

(56) References Cited

U.S. PATENT DOCUMENTS

| 2013/0085976 | A1* | 4/2013 | Bone | ............... | B60W 30/18163 706/46 |
|---|---|---|---|---|---|
| 2020/0257308 | A1* | 8/2020 | Herman | ............... | G05D 1/0255 |
| 2021/0101589 | A1* | 4/2021 | Jeon | ..................... | B62D 15/025 |

FOREIGN PATENT DOCUMENTS

| CN | 104827966 A | * | 8/2015 | | |
|---|---|---|---|---|---|
| CN | 108275149 A | * | 7/2018 | .............. | B60T 13/66 |

(Continued)

OTHER PUBLICATIONS

Office Action issued in corresponding Korean Patent Application No. 10-2020-0040999, dated May 7, 2021.

*Primary Examiner* — Peter D Nolan
*Assistant Examiner* — Demetra R Smith-Stewart
(74) *Attorney, Agent, or Firm* — Morgan, Lewis & Bockius LLP

(57) ABSTRACT

Provided is a vehicle including: a camera provided on the vehicle to have an external view of the vehicle and acquiring image data; a radar provided in the vehicle to have an external sensing field of view of the vehicle and obtaining radar data; and a controller including at least one processor for processing image data acquired by the camera and radar data acquired by the radar, and wherein when an attempt to change the lane of the vehicle is detected, the controller may detect other vehicle on the side of the lane to be changed based on the radar data, determine whether a collision with the other vehicle is possible based on driving information received from the other vehicle through a communication module of the vehicle, and transmit a warning signal for controlling the warning system of the vehicle to the vehicle in case of a collision with the other vehicle is expected.

18 Claims, 11 Drawing Sheets

(51) Int. Cl.
  *B60W 30/18*      (2012.01)
  *B60W 30/12*      (2020.01)
  *B60W 10/20*      (2006.01)
  *H04W 4/46*       (2018.01)
  *B60W 30/09*      (2012.01)
  *G01S 15/931*     (2020.01)
  *G06V 20/58*      (2022.01)

(52) U.S. Cl.
  CPC ........ *B60W 30/0956* (2013.01); *B60W 30/12* (2013.01); *B60W 30/18163* (2013.01); *G01S 15/931* (2013.01); *G06V 20/58* (2022.01); *H04W 4/46* (2018.02); *B60W 2554/80* (2020.02); *B60W 2556/65* (2020.02)

(58) Field of Classification Search
  CPC ............. B60W 30/0956; B60W 30/12; B60W 30/18163; G01S 15/931
  See application file for complete search history.

(56) References Cited

FOREIGN PATENT DOCUMENTS

| | | |
|---|---|---|
| JP | 5-134036 A | 5/1993 |
| JP | 2010-6271 A | 1/2010 |
| JP | 2016-200443 A | 12/2016 |
| KR | 10-1399026 B1 | 5/2014 |
| KR | 10-2017-0070580 A | 6/2017 |

\* cited by examiner

[FIG.1]
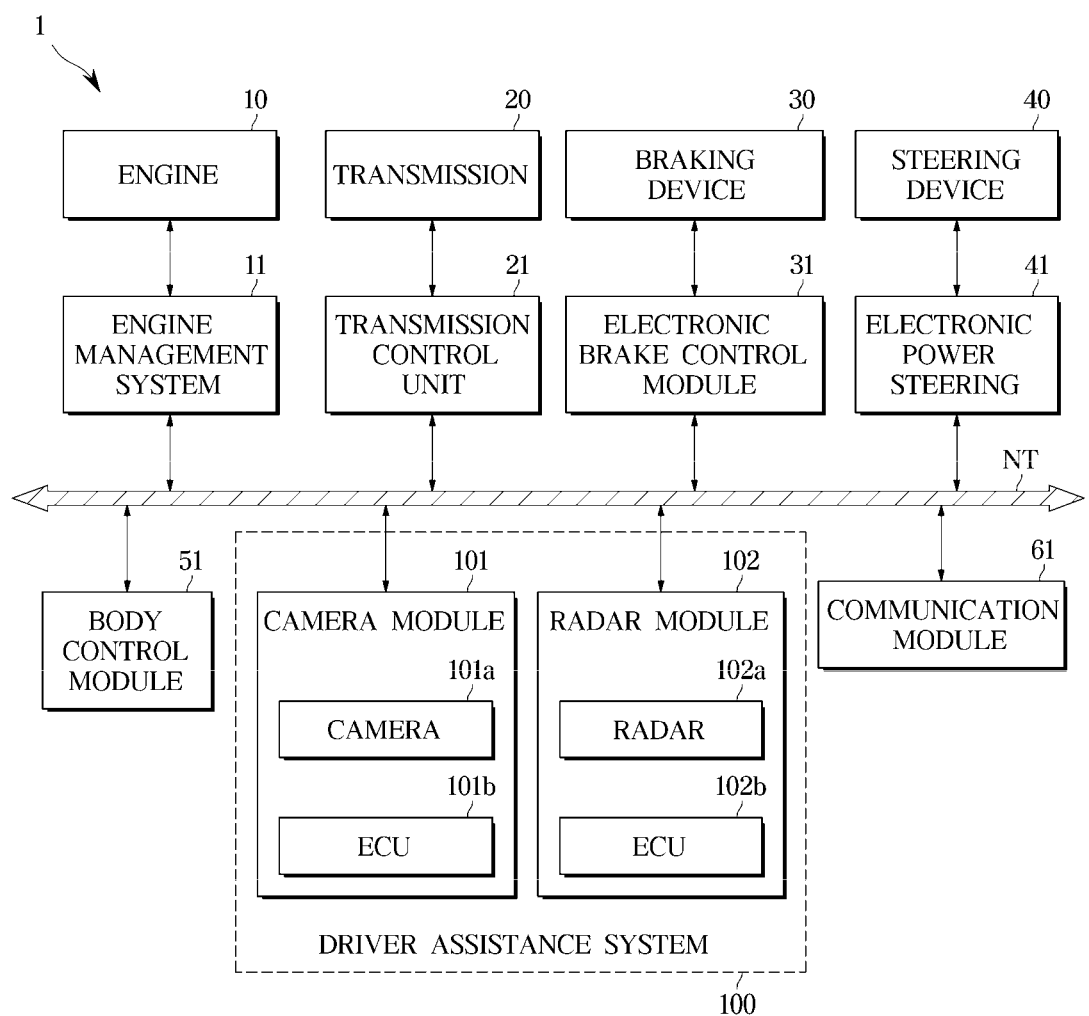

[FIG.2]
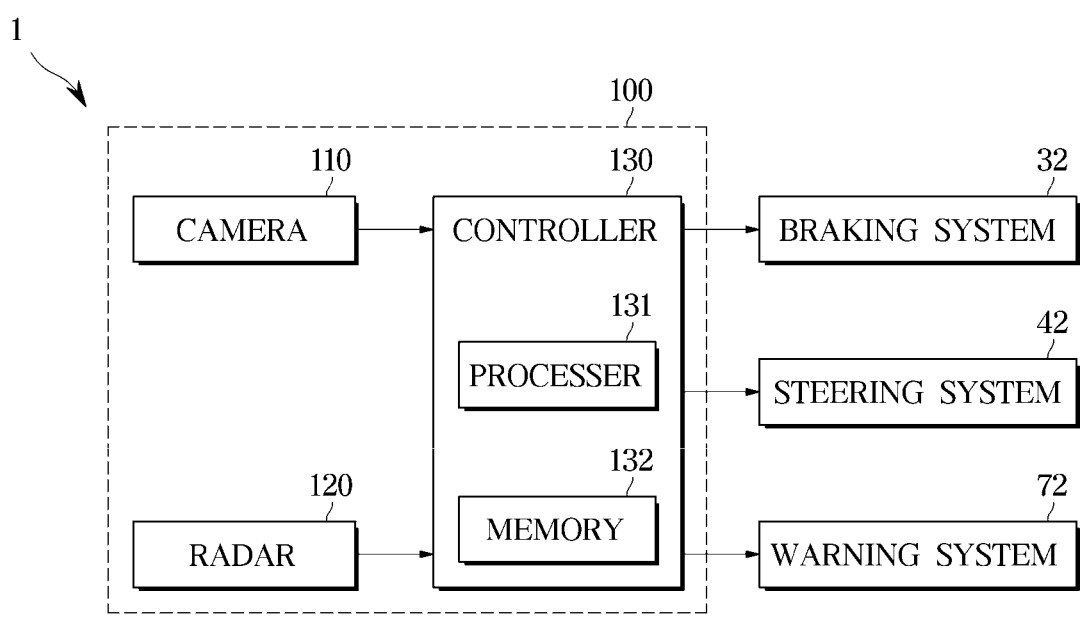

[FIG.3]
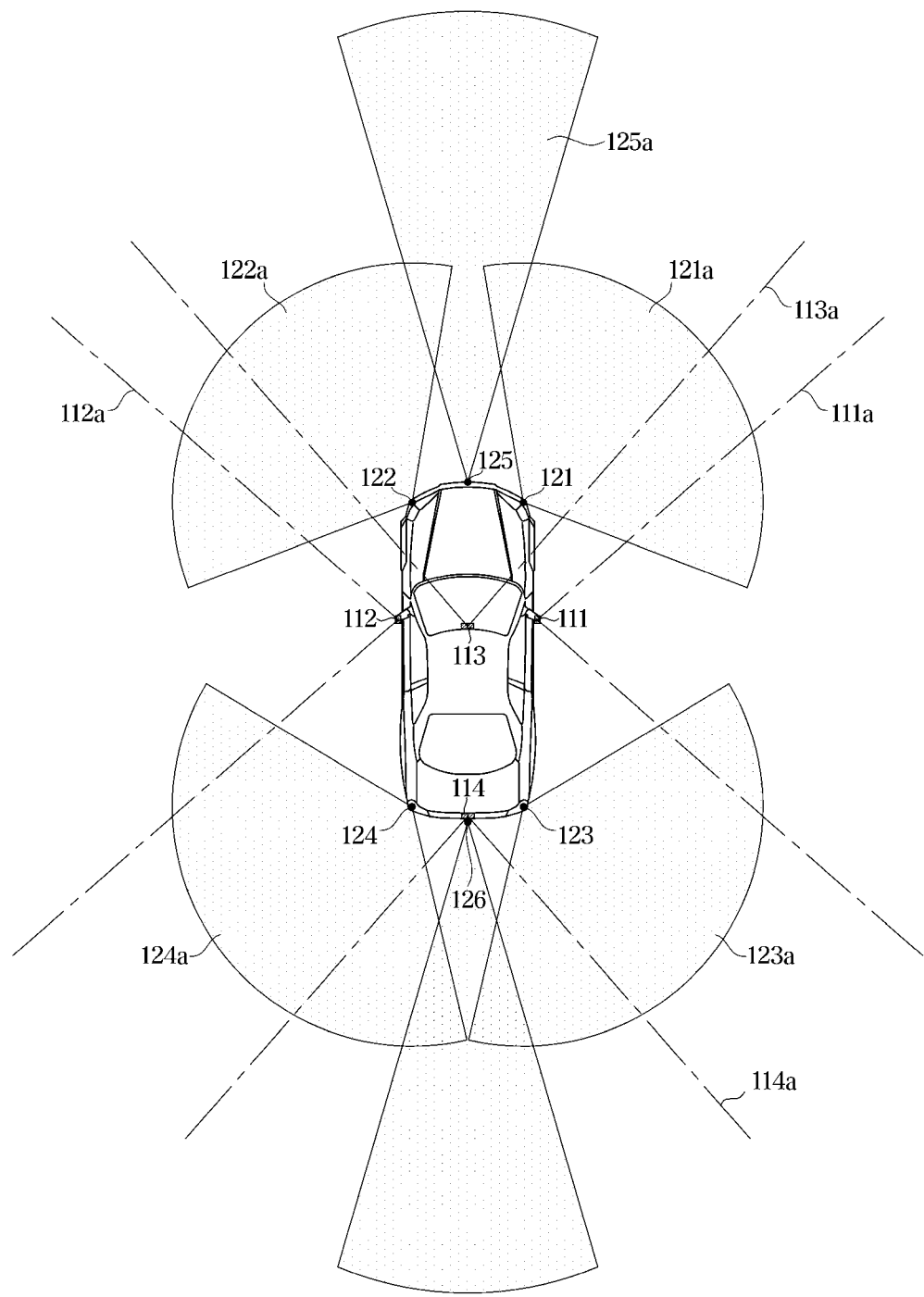

[FIG.4]
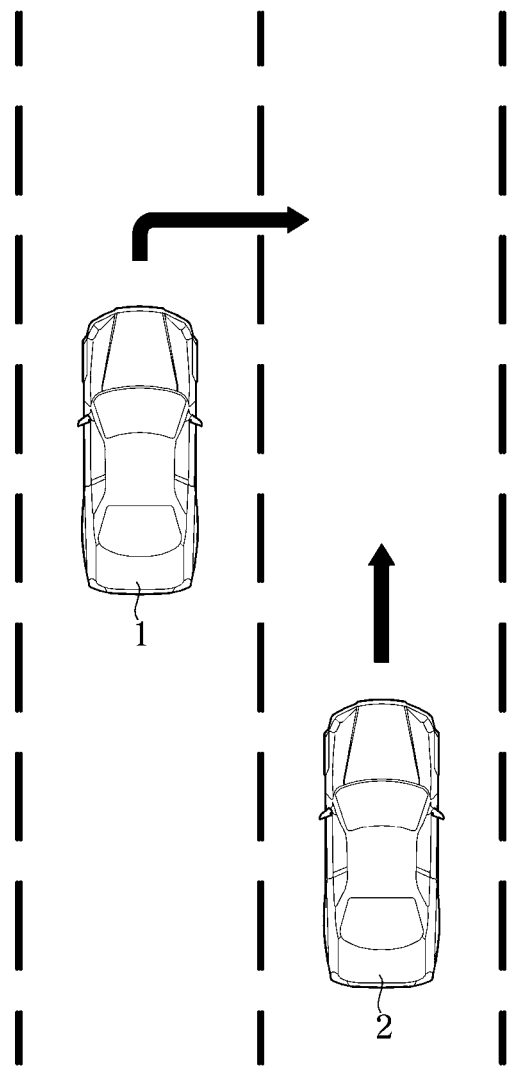

[FIG.5]
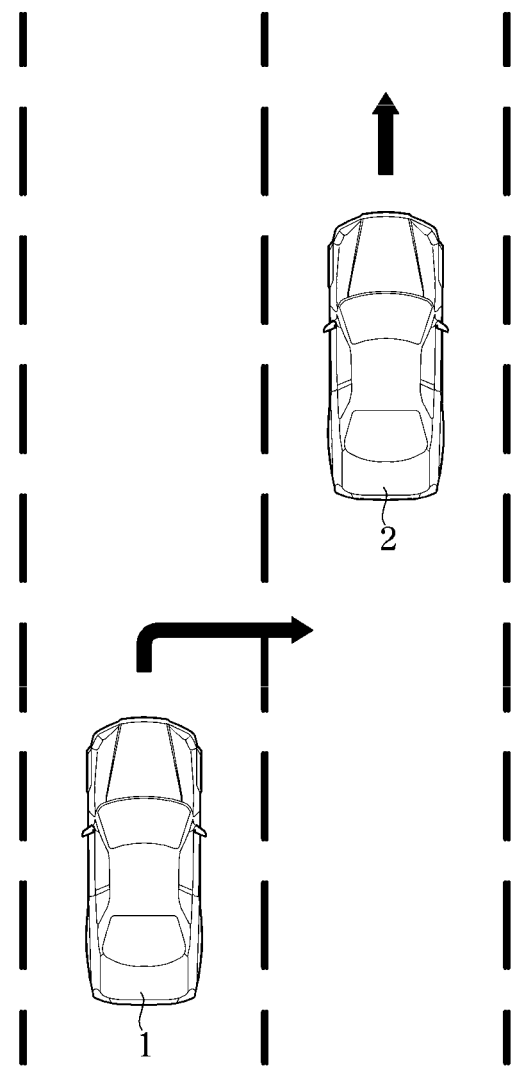

[FIG.6]
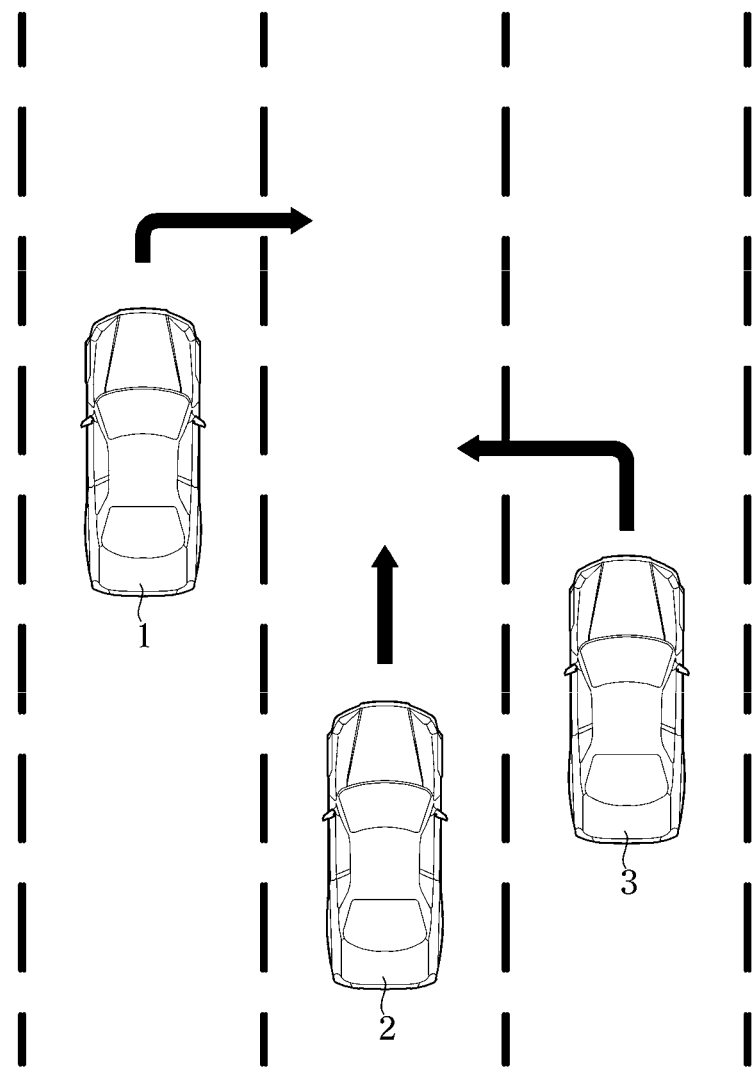

[FIG.7]
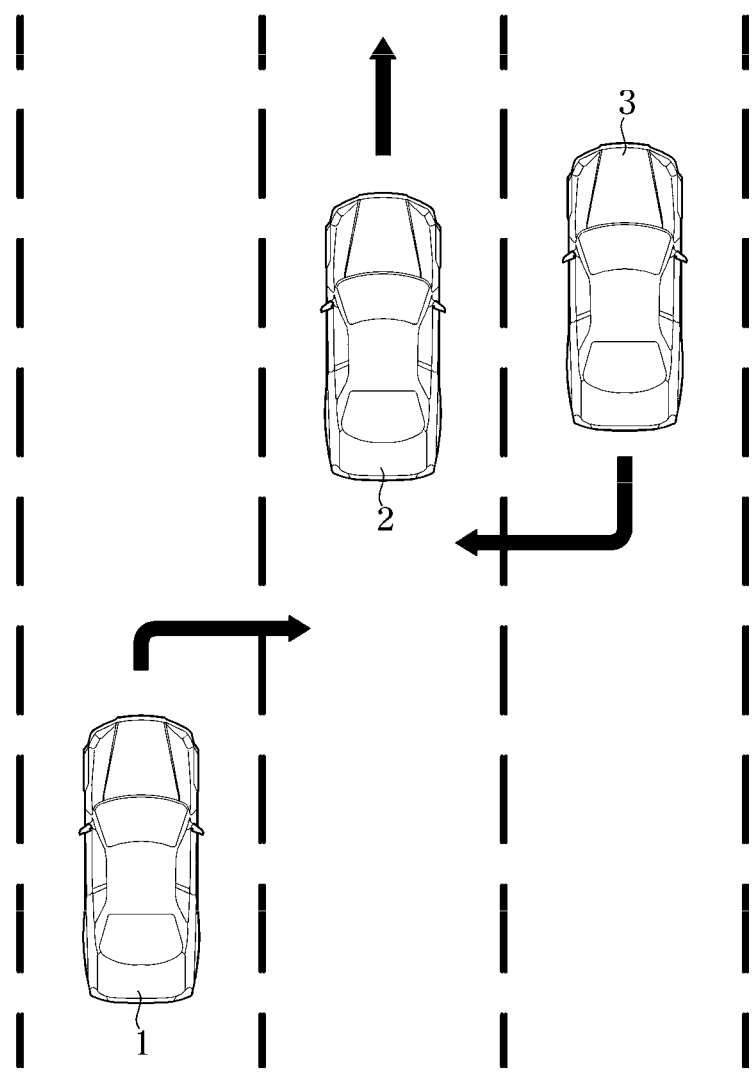

[FIG.8]
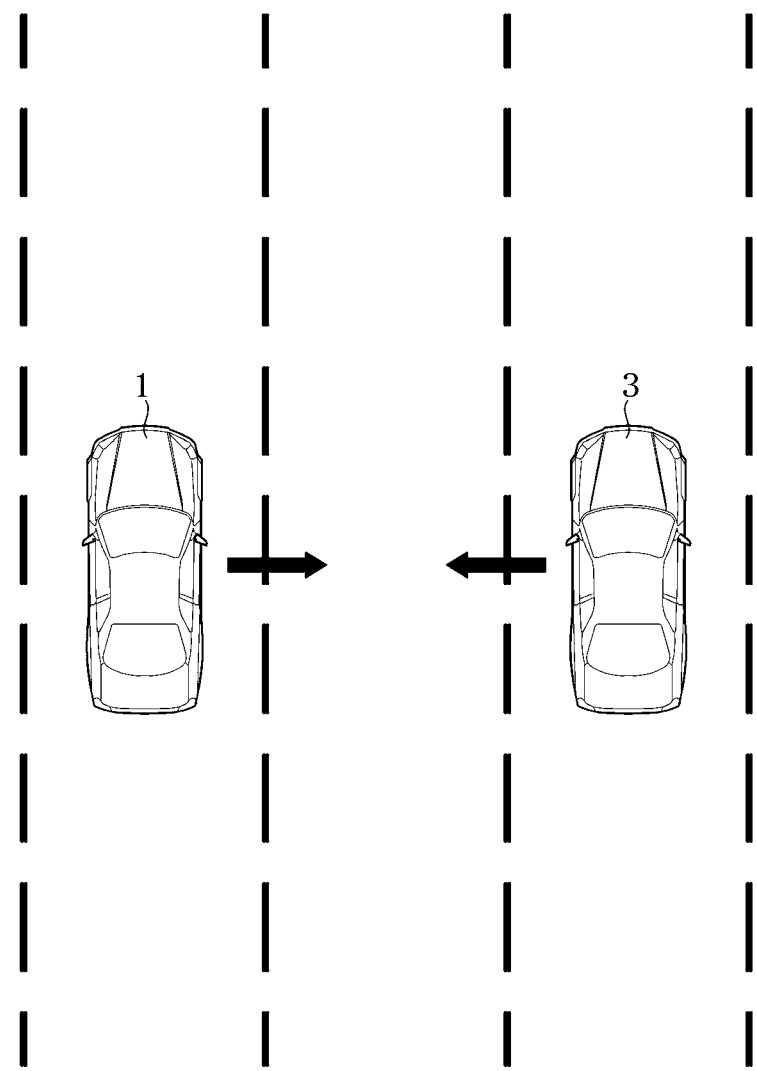

[FIG.9]
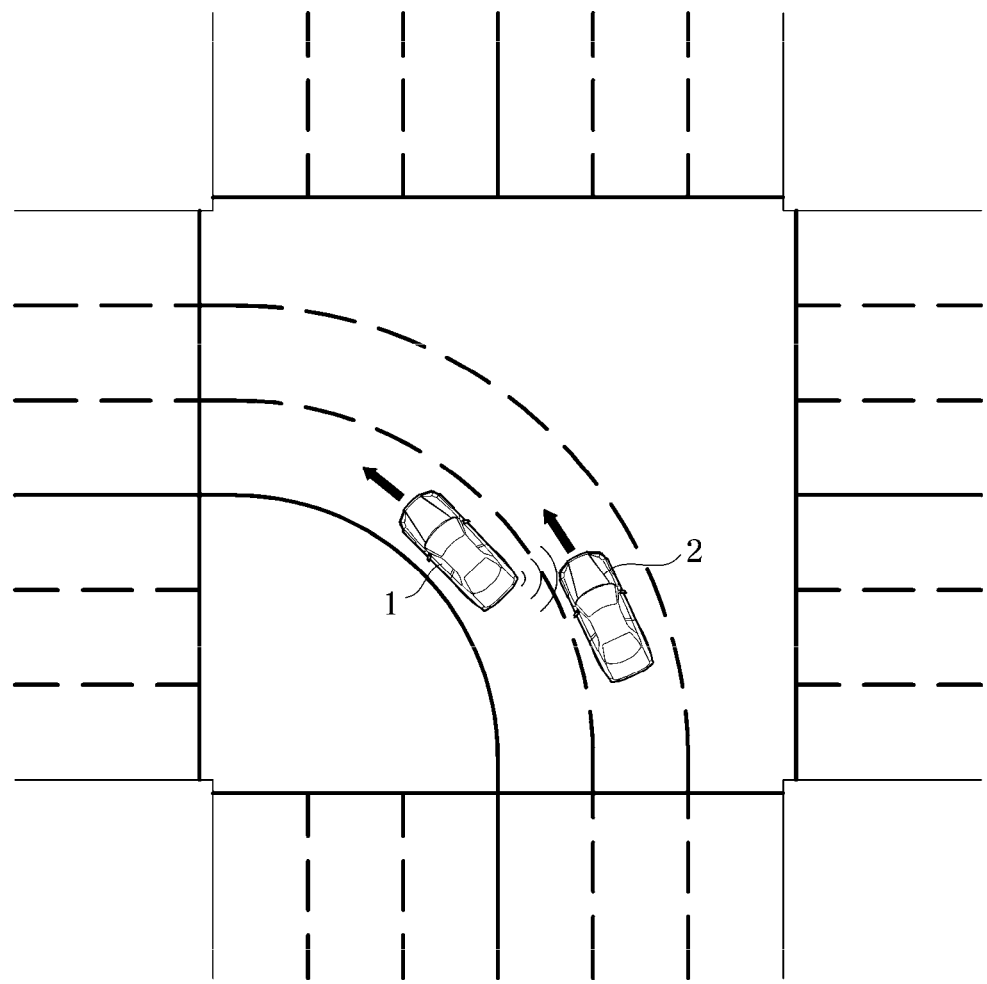

[FIG.10a]
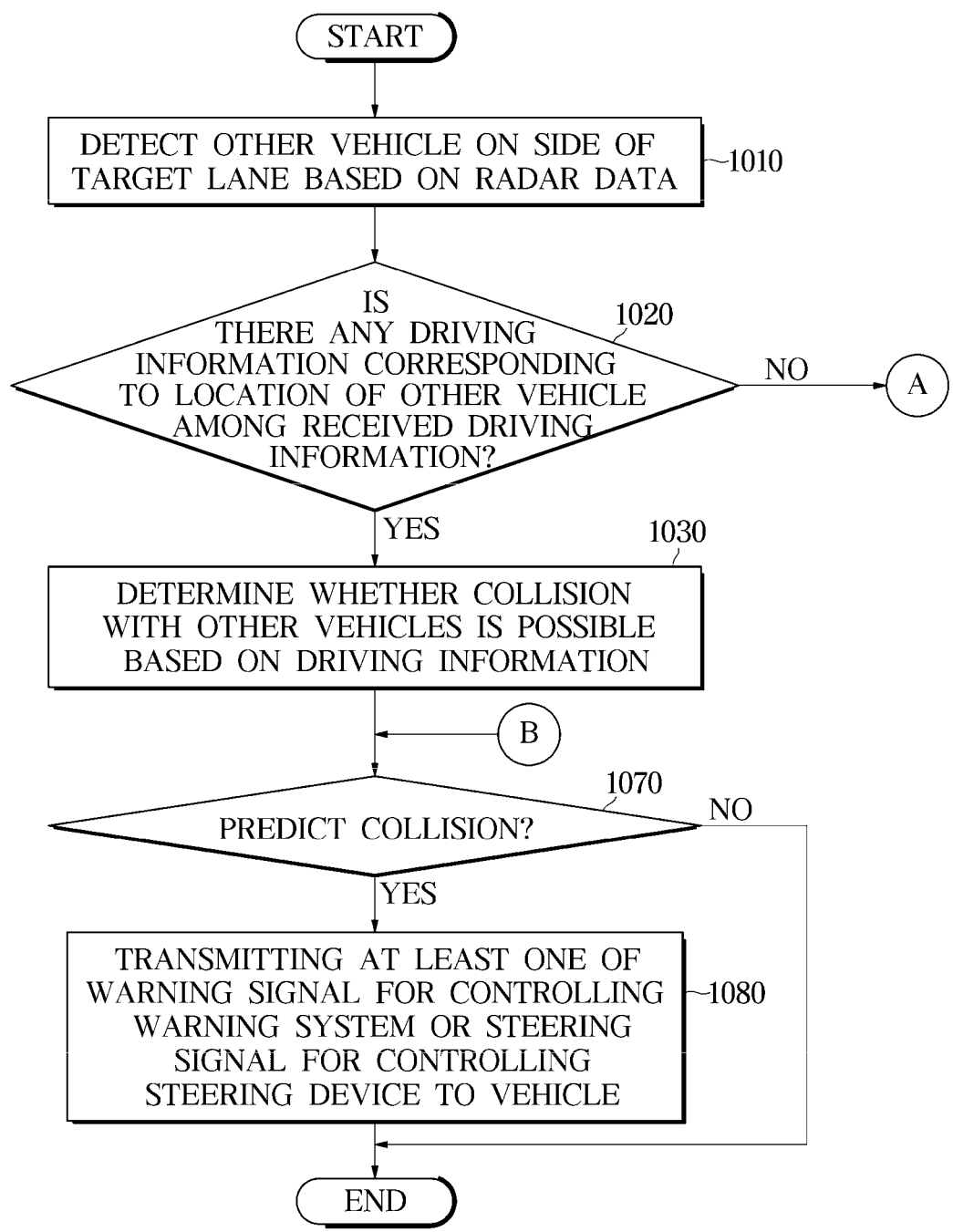

[FIG.10b]
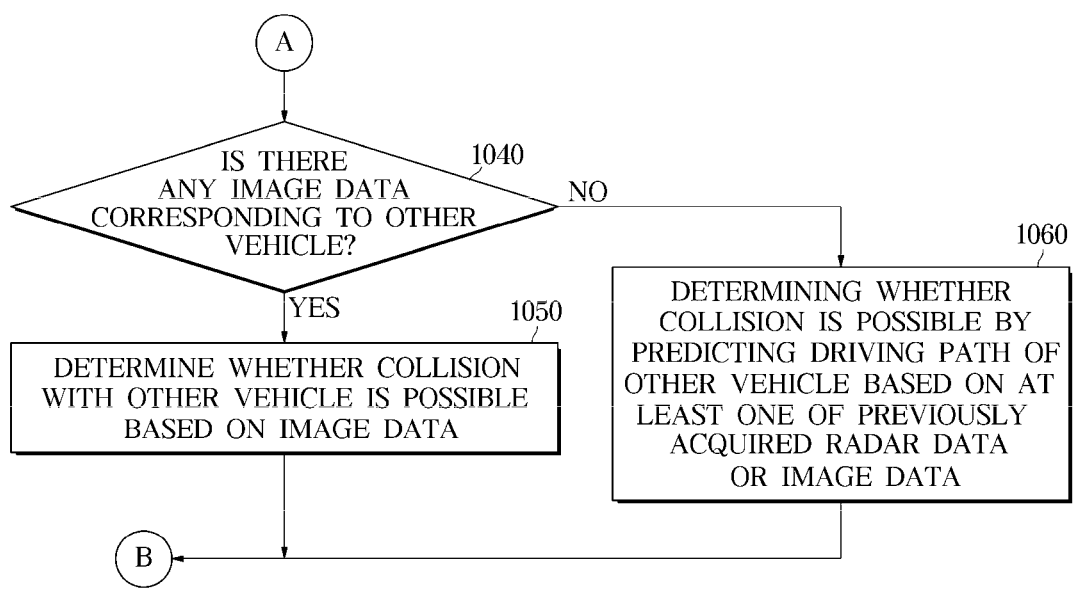

DRIVER ASSISTANCE SYSTEM AND CONTROL METHOD FOR THE SAME

CROSS-REFERENCE TO RELATED APPLICATION

This application is based on and claims priority under 35 U.S.C. § 119 to Korean Patent Application No. 2020-0040999, filed on Apr. 3, 2020 in the Korean Intellectual Property Office, the disclosure of which is incorporated herein by reference.

BACKGROUND

1. Field

The present disclosure relates to a driver assistance system.

2. Description of the Related Art

Recently, in order to reduce the burden on the driver and improve convenience, research on vehicles equipped with an Advanced Driver Assistance System (ADAS) that actively provides information on vehicle status, driver status, and surrounding environment is actively being conducted.

As an example of an advanced driver assistance system mounted on a vehicle, there are a Blind Spot Detection (BSD) and a Lane Change Assist (LCA).

Such a system is a collision avoidance and warning provision system through determining the risk of collision with an object from the side in a driving situation of the vehicle and maintaining lane in a collision situation.

However, despite information through a radar or a camera, a situation difficult to avoid a collision with an object may occur, and thus a collision between a vehicle and an object has not been sufficiently avoided.

SUMMARY

Therefore, it is an object of the disclosure to provide a driver assistance system capable of avoiding a collision and a control method for the same including: detecting another vehicle from the side using radar data, and determining the possibility of collision with other vehicle when changing lanes based on the driving information of other vehicle received through V2V (Vehicle to Vehicle) communication.

It is an aspect of the disclosure to provide a vehicle including: a camera provided on the vehicle to have an external view of the vehicle and acquiring image data; a radar provided in the vehicle to have an external sensing field of view of the vehicle and obtaining radar data; and a controller including at least one processor for processing image data acquired by the camera and radar data acquired by the radar, and wherein the controller may detect another vehicle on the side of the lane to be changed based on the radar data when an attempt to change the lane of the vehicle is detected, determine whether a collision with the other vehicle is possible based on driving information received from the other vehicle through a communication module of the vehicle, and transmit a warning signal for controlling the warning system of the vehicle to the vehicle in case of a collision with the other vehicle is expected.

When a collision with the other vehicle is expected, the controller may transmit a steering signal for controlling a steering device of the vehicle to maintain the vehicle lane to the vehicle.

The driving information may include at least one of speed information, acceleration information, steering information, direction indication lamp operation information, and location information. The controller may transmit at least one of the warning signal and the steering signal to the vehicle when the speed of the other vehicle is higher than the speed of the vehicle, based on the signal driving information received from the other vehicle located in the change target lane and located at the rear of the vehicle.

The controller may transmit at least one of the warning signal and the steering signal to the vehicle when the speed of the other vehicle is lower than the speed of the vehicle, based on driving information received from the other vehicle located in the change target lane and located in front of the vehicle.

The controller may transmit at least one of the warning signal and the steering signal to the vehicle when the other vehicle accelerates and steers to the change target lane, based on driving information received from the other vehicle located in a lane next to the change target lane and located at the rear of the vehicle.

The controller may transmit at least one of the warning signal and the steering signal to the vehicle when the other vehicle is decelerated and steers to the change target lane, based on driving information received from the other vehicle located in a lane next to the change target lane and located in front of the vehicle.

The controller may transmit at least one of the warning signal and the steering signal to the vehicle when the other vehicle steers to the change target lane, based on driving information received from the other vehicle located in a lane next to the change target lane and located on the side of the vehicle.

The controller may determine whether the other vehicle around the vehicle rotates based on the radar data when the vehicle rotates, determine whether a direction indicator lamp of the other vehicle around the vehicle operates based on driving information received from the vehicle around the vehicle when the other vehicle around the vehicle rotates in the same direction as the vehicle, and stop an operation of transmitting the warning signal to the vehicle when the direction indicator lamp of the other vehicle nearby operates.

The controller may determine driving information having location information corresponding to the location of the other vehicle detected based on the radar data among the received driving information, and determine whether a collision with the other vehicle is possible based on the determined driving information.

The controller may detect the other vehicle based on at least one of the image data and determine whether a collision with the other vehicle is possible when there is no driving information having location information corresponding to the location of the other vehicle detected based on the radar data among the received driving information.

The controller may predict a driving path of the other vehicle and determine whether a collision with the other vehicle is possible based on at least one of previously acquired radar data or image data when the other vehicle is not detected, based on the image data.

A driver assistance system according to an exemplary embodiment of the present disclosure, including a camera provided on the vehicle to have an external view of the vehicle and acquiring image data; a radar provided on the vehicle to have an external sensing field of view for the vehicle and acquiring radar data; and a controller including at least one processor for processing the image data acquired by the camera and the radar data acquired by the radar, comprises: detecting another vehicle on the side of the lane to be changed based on the radar data when detecting an attempt to change the lane of the vehicle; determining whether a collision with the other vehicle is possible based on driving information received from the other vehicle through the communication module of the vehicle; and transmitting a warning signal for controlling the warning system of the vehicle to the vehicle when a collision with the other vehicle is expected.

The control method of the driver assistance system may further include transmitting a steering signal for controlling a steering device of the vehicle to the vehicle so that the vehicle maintains a lane when a collision with the other vehicle is expected.

The driving information may include at least one of speed information, acceleration information, steering information, direction indication lamp operation information, and location information.

The control method of the driver assistance system may further include transmitting at least one of the warning signal and the steering signal to the vehicle when the speed of the other vehicle is higher than the speed of the vehicle, based on signal driving information received from the other vehicle located in the change target lane and located in the rear of the vehicle.

The control method of the driver assistance system may further include transmitting at least one of the warning signal and the steering signal to the vehicle when the speed of the other vehicle is lower than the speed of the vehicle, based on driving information received from the other vehicle located in the change target lane and located in front of the vehicle.

The control method of the driver assistance system may include transmitting at least one of the warning signal or the steering signal to the vehicle when the other vehicle is accelerating and steering to the target lane, based on driving information received from the other vehicle located in a lane next to the change target lane and located at the rear of the vehicle.

The control method of the driver assistance system may further include transmitting at least one of the warning signal and the steering signal to the vehicle when the other vehicle is decelerating and steering to the target lane, based on driving information received from the other vehicle located in a lane next to the change target lane and located in front of the vehicle.

The control method of the driver assistance system may further include transmitting at least one of the warning signal or the steering signal to the vehicle when the other vehicle is steering to the change target lane, based on driving information received from the other vehicle located in a lane next to the change target lane and located on the side of the vehicle.

According to an aspect of the present disclosure, it is possible to provide a driver assistance system and a driver assistance method capable of avoiding a collision, by detecting another vehicle from the side using radar data, and determining the possibility of collision with the other vehicle when changing lanes based on the driving information of other vehicles received through V2V (Vehicle to Vehicle) communication.

BRIEF DESCRIPTION OF THE DRAWINGS

These and/or other aspects of the disclosure will become apparent and more readily appreciated from the following description of the embodiments, taken in conjunction with the accompanying drawings of which:

FIG. 1 illustrates a configuration of a vehicle according to an exemplary embodiment of the present disclosure.

FIG. 2 illustrates a configuration of a driver assistance system according to an exemplary embodiment of the present disclosure.

FIG. 3 illustrates a camera and a radar included in a driver assistance system according to an exemplary embodiment of the present disclosure.

FIG. 4 is a view illustrating a case where a driver assistance system according to an exemplary embodiment of the present disclosure detects another vehicle in a lane to be changed located in a rear side.

FIG. 5 is a view illustrating a case where a driver assistance system according to an exemplary embodiment of the present disclosure detects another vehicle in a lane to be changed located in the front side.

FIG. 6 illustrates a case in which the driver assistance system according to an exemplary embodiment of the present disclosure detects another vehicle in a lane next to a lane to be changed located in a rear side.

FIG. 7 is a view illustrating a case in which the driver assistance system according to an exemplary embodiment of the present disclosure detects another vehicle in a lane next to a lane to be changed located in the front side.

FIG. 8 illustrates a case where the driver assistance system according to an exemplary embodiment of the present disclosure detects another vehicle in a lane next to a lane to be changed.

FIG. 9 is a view illustrating an operation of a driver assistance system according to an exemplary embodiment of the present disclosure when a vehicle is rotated.

FIG. 10a is a flowchart illustrating a case of assisting a lane change in a method of controlling a driver assistance system according to an exemplary embodiment of the present disclosure.

FIG. 10b is a portion of the flowchart shown in FIG. 10a.

DETAILED DESCRIPTION

Like numerals refer to like factors throughout the specification. Not all factors of embodiments of the present disclosure will be described, and description of what are commonly known in the art or what overlap each other in the embodiments will be omitted.

The terms as used throughout the specification, such as "~part", "~module", "~member", "~block", etc., may be implemented in software or hardware, and a plurality of "~parts", "~modules", "~members", or "~blocks" may be implemented in a single factor, or a single "~part", "~module", "~member", or "~block" may include a plurality of factors.

It will be further understood that the term "connect" or its derivatives refer both to direct and indirect connection, and the indirect connection includes a connection over a wireless communication network.

It will be further understood that the terms "comprises" and/or "comprising," when used in this specification, specify the presence of stated features, integers, steps, operations, factors, and/or components, but do not preclude the presence or addition of one or more other features, integers, steps, operations, factors, components, and/or groups thereof, unless the context clearly indicates otherwise.

In the specification, it should be understood that, when a member is referred to as being "on/under" another member, it can be directly on/under the other member, or one or more intervening members may also be present.

The terms including ordinal numbers like "first" and "second" may be used to explain various components, but the components are not limited by the terms. The terms are only for distinguishing a component from another.

As used herein, the singular forms "a," "an" and "the" are intended to include the plural forms as well, unless the context clearly indicates otherwise.

Reference numerals used for method steps are just used for convenience of explanation, but not to limit an order of the steps. Thus, unless the context clearly dictates otherwise, the written order may be practiced otherwise.

Hereinafter, the operating principles and embodiments of the present disclosure will be described with reference to the accompanying drawings.

FIG. 1 illustrates a configuration of a vehicle according to an exemplary embodiment of the present disclosure.

As shown in FIG. 1, the vehicle 1 includes an engine 10, a transmission 20, a braking device 30, and a steering device 40. The engine 10 includes a cylinder and a piston, and may generate power for the vehicle 1 to drive. The transmission 20 includes a plurality of gears, and may transmit power generated by the engine 10 to a wheel. The braking device 30 may decelerate the vehicle 1 or stop the vehicle 1 through friction with a wheel. The steering device 40 may change the driving direction of the vehicle 1.

However, the configuration of the vehicle 1 of the present disclosure is not limited to the above-described example, and the vehicle 1, according to an exemplary embodiment, may further include a motor (not shown) that transmits power to the wheels in addition to the engine 10 and the transmission 20, or include only a motor without including the engine 10 and the transmission 20.

The vehicle 1 may include a plurality of electric components. For example, the vehicle 1 may further include an Engine Management System (EMS) 11, a Transmission Control Unit (TCU) 21, an electronic brake control module 31, an Electronic Power Steering (EPS) 41, a Body Control Module (BCM) 51, a communication module 61, and a Driver Assistance System (DAS) 100.

The engine management system 11 may control the engine 10 in response to a driver's willingness to accelerate through an accelerator pedal or a request from the driver assistance system 100. For example, the engine management system 11 may control the torque of the engine 10.

The transmission control unit 21 may control the transmission 20 in response to a driver's shift command through a shift lever and/or a driving speed of the vehicle 1. For example, the transmission control unit 21 may adjust a shift ratio from the engine 10 to a wheel.

However, as described above, the vehicle 1, according to the embodiment, may correspond to a hybrid vehicle further including a motor, or may correspond to an electric vehicle including only a motor, and accordingly the engine management system 11 and the transmission control unit 21, according to the embodiment, may be omitted.

The electronic braking control module 31 may control the braking device 30 in response to a driver's braking will through a braking pedal and/or slip of wheels. For example, the electronic braking control module 31 may temporarily release the braking of a wheel in response to a slip of a wheel detected when the vehicle 1 is braking (anti-lock braking systems, ABS). The electronic braking control module 31 may selectively release the braking of the wheel in response to oversteering and/or understeering detected during steering of the vehicle 1 (electronic stability control, ESC). In addition, the electronic brake control module 31 may temporarily brake a wheel in response to a slip of the wheel detected when the vehicle 1 is driven (traction control system, TCS).

The electronic steering device 41 may assist the operation of the steering device 40 so that the driver can easily manipulate the steering wheel in response to the driver's will to steer through the steering wheel. For example, the electronic steering device 41 may assist the operation of the steering device 40 so as to decrease the steering force when driving at a low speed or park, and increase the steering force when driving at a high speed.

The body control module 51 may control the operation of electronic components that provide convenience to the driver or ensure safety of the driver. For example, the body control module 51 may control a head lamp, a wiper, a cluster, a multi-function switch, and a direction indicator lamp.

The communication module 61 may transmit and receive data between another vehicle located outside the vehicle 1. That is, the communication module 61 may support V2V (Vehicle to Vehicle) communication, and may transmit and receive data with the other vehicle based on a known communication protocol.

The driver assistance system 100 may assist the driver in operating (driving, braking, steering) the vehicle 1. For example, the driver assistance system 100 may detect the environment around the vehicle 1 (e.g., other vehicles, pedestrians, cyclists, lanes, road signs, etc.), and control driving and/or braking and/or steering of the vehicle 1 in response to the detected environment.

The driver assistance system 100 may provide various functions to a driver. For example, the driver assistance system 100 may provide a Lane Departure Warning (LDW), a Lane Keeping Assist (LKA), a Blind Spot Detection (BSD), a Lane Change Assist (LCA), a High Beam Assist (HBA), an Autonomous Emergency Braking (AEB), a Traffic Sign Recognition (TSR), and a Smart Cruise Control (SCC), etc.

The driver assistance system 100 may include a camera module 101 configured to acquire image data around the vehicle 1 and a radar module 102 configured to acquire object data around the vehicle 1. The camera module 101 may include a camera 101a and a controller (electronic control unit, ECU) 101b, and may photograph the front of the vehicle 1 and recognize other vehicles, pedestrians, cyclists, lanes, road signs, etc.

The driver assistance system 100 is not limited to illustration in FIG. 1, and may further include a lidar that scans around the vehicle 1 and detects an object. The above electronic components may communicate with each other through a vehicle communication network (NT). For example, electronic components may transmit and receive data through an Ethernet, a Media Oriented Systems Transport (MOST), a flexray, a Controller Area Network (CAN), and a Local Interconnect Network (LIN). For example, the driver assistance system 100 may transmit a drive control signal, a braking signal, and a steering signal to the engine management system 11, the electronic brake control module 31, and the electronic steering device 41 through the vehicle communication network NT, respectively, and receive data received from the other vehicle from the communication module 61 through the vehicle communication network NT.

FIG. 2 illustrates a configuration of a driver assistance system according to an exemplary embodiment of the present disclosure. FIG. 3 illustrates a camera and a radar included in a driver assistance system according to an exemplary embodiment of the present disclosure.

As shown in FIG. 2, the vehicle 1 may include a braking system 32, a steering system 42, a warning system 72, and a driver assistance system 100.

The braking system 32 may include an electronic braking control module 31 (see FIG. 1) and a braking device 30 (see FIG. 1), described with reference to FIG. 1, and the steering system 42 may include an electronic steering device 41 (see FIG. 1) and a steering device 40 (see FIG. 1).

The warning system 72 may provide a warning to the driver based on a warning signal received from the driver assistance system 100 through the vehicle network NT.

To this end, the warning system 72 may include a processor, and may include a speaker configured to provide a warning sound to the driver based on the warning signal and a display configured to display a warning message to the driver based on the warning signal. The speaker and display may be provided inside the vehicle 1 to provide a warning to the driver.

In addition, the warning system 72 may include warning indicators provided on each of the left side mirror and the right side mirror. A directional warning may be provided to the driver as a warning indicator in a side mirror corresponding to a location where a danger is expected to occur based on the warning signal is lighting on.

The driver assistance system 100 may include a camera 110 and a radar 120.

The camera 110 may have a field of view 111a, 112a, 113a, and 114a facing the outside of the vehicle 1, as shown in FIG. 3.

To this end, the camera 110 includes a right side camera 111 configured to acquire image data for the right room, a left side camera 112 configured to image data for the left, and image data for the front side, a front camera 113 configured to image data for the front and a rear camera 114 configured to image data for the rear.

Each of the right side camera 111 and the left side camera 112 may be provided in, for example, a right side mirror and a left side mirror.

The front camera 113 may be installed, for example, on the front windshield of the vehicle 1, and the rear camera 114 may be installed, for example, in the trunk of the vehicle 1.

However, the installation location and number of each camera 110 is not limited to the above-described example, and may be provided in various ways according to embodiments.

The camera 110 may photograph the outside of the vehicle 1 and acquire image data of the outside of the vehicle 1.

The image data outside the vehicle 1 may include a location of the other vehicle or pedestrian or a cyclist or lane located outside the vehicle 1.

The camera 110 may include a plurality of lenses and an image sensor. The image sensor may include a plurality of photodiodes that convert light into electrical signals, and the plurality of photodiodes may be arranged in a two-dimensional matrix.

The camera 110 may be electrically connected to the controller 130.

For example, the camera 110 is connected to the controller 130 through a vehicle communication network (NT), or connected to the controller 130 through a hard wire, or connected to the controller 130 through a printed circuit board (PCB).

The camera 110 may transmit image data outside the vehicle 1 to the controller 130.

As shown in FIG. 3, the radar 120 includes corner radars 121, 122, 123, 124 provided at the corners of the vehicle 1; a front radar 125 having a field of sensing facing the front of the vehicle 1; and a rear radar 125 having a field of sensing facing the rear of the vehicle 1.

The plurality of corner radars 121, 122, 123, 124 include a first corner radar 121 installed on the front right side of the vehicle 1, a second corner radar 122 installed on the front left side of the vehicle 1, a third corner radar 123 installed on the rear right side of the vehicle 1, and a fourth corner radar 124 installed on the rear left side of the vehicle 1.

As shown in FIG. 3, the first corner radar 121 may have a detection field 121a facing the front right side of the vehicle 1. The second corner radar 122 may have a detection field 122a facing the front left side of the vehicle 1, and may be installed, for example, on the left side of the front bumper of the vehicle 1. The third corner radar 123 may have a detection field 123a facing the rear right side of the vehicle 1, and may be installed, for example, on the right side of the rear bumper of the vehicle 1. The fourth corner radar 124 may have a detection field 124a facing the rear left side of the vehicle 1, and may be installed, for example, on the left side of the rear bumper of the vehicle 1.

Each of the first, second, third and fourth corner radars 121, 122, 123, 124 may include a transmission antenna and a reception antenna. The first, second, third and fourth corner radars 121, 122, 123, 124 may acquire first corner radar data, second corner radar data, third corner radar data, and fourth corner radar data, respectively. The first corner radar data may include distance information and speed levels of other vehicles, pedestrians, or cyclists (hereinafter referred to as "objects") located on the right in front of the vehicle 1. The second corner radar data may include distance information and a speed level of an object located on the left in front of the vehicle 1. The third and fourth corner radar data may include distance information and relative speeds of objects located at the rear right of the vehicle 1 and the rear left of the vehicle 1.

Each of the first, second, third and fourth corner radars 121, 122, 123, 124 may be connected to the controller 130 through, for example, a vehicle communication network (NT) or a hard wire or a printed circuit board. The first, second, third, and fourth corner radars 121, 122, 123, and 124 may transmit first, second, third, and fourth corner radar data to the controller 130, respectively.

The front radar 125 may be installed on the right side of the front bumper of the vehicle 1, for example.

The front radar 125 may have a field of sensing 125a facing the front of the vehicle 1 as shown in FIG. 3. The front radar 125 may be installed, for example, on a grille or bumper of the vehicle 1.

The front radar 125 may include a transmission antenna (or a transmission antenna array) configured to radiate a transmission wave toward the front of the vehicle 1, and a reception antenna (or a reception antenna array) configured to receive the reflected wave reflected from the object. The front radar 125 may acquire front radar data from the transmission wave transmitted by the transmission antenna and the reflected wave received by the reception antenna. The front radar data may include distance information and speed levels of other vehicles or pedestrians or cyclists located in front of the vehicle 1. The front radar 125 may calculate the state distance to the object based on the phase difference (or time difference) between the transmitted and reflected waves, and calculate the relative speed of the object based on the frequency difference between the transmitted and reflected waves.

The front radar 125 may be connected to the controller 130 through, for example, a communication network NT for a vehicle or a hard wire or a printed circuit board. The front radar 125 may transmit front radar data to the controller 130.

The rear radar 126 may acquire rear radar data for the rear of the vehicle 1 and may be provided on a bumper of the vehicle 1.

The controller 130 may include a controller 101b (see FIG. 1) of the camera module 101 (see FIG. 1) and/or a controller 102b (see FIG. 1) of the radar module 102 (see FIG. 1) and/or separate integrated controller.

The controller 130 includes a processor 131 and a memory 132.

The processor 131 may process image data of the camera 110 and radar data of the radar 120, and generate a braking signal, a steering signal, and a warning signal for controlling the braking system 32, the steering system 42, and the warning system 72.

For example, the processor 131 may include an image processor configured to process image data of the camera 110 and/or a digital signal processor configured to process radar data of the radars 120 and/or a micro control unit (MCU) configured to generate a braking signal, a steering signal, and a warning signal.

The processor 131 may detect another vehicle located outside the vehicle 1 based on the radar data of the radar 120.

Specifically, when detecting an attempt to change the lane of the vehicle 1 through the steering angle of the steering device 40 or the operation of a direction indicator lamp, the processor 131 may detect another vehicle on the side of the lane to be changed based on the radar data of the radar 120.

That is, when the vehicle 1 attempts to change lanes to the right, the processor 131 may detect another vehicle located on the right side of the vehicle 1 based on radar data received from the first corner radar 121 and the third corner radar 123.

In this case, the other vehicle may be a vehicle located in a lane to be changed or a vehicle located in a lane next to the lane to be changed.

After detecting the other vehicle through radar data, the processor 131 may determine whether a collision with the detected other vehicle is possible based on driving information received from the other vehicle detected through the communication module of the vehicle 1.

Specifically, the processor 131 may determine driving information including location information corresponding to the detected location of the other vehicle among driving information received through the communication module, and determine whether a collision with the other vehicle is possible based on the determined driving information.

In this case, the driving information may include at least one of speed information, acceleration information, steering information, direction indication lamp operation information, or location information.

That is, when receiving driving information corresponding to the other vehicle detected based on the radar data from the other vehicle, the processor 131 may calculate an expected collision time (Time to Collision, TTC) with the other vehicle or a distance to collision (Distance to Collision, DTC) based on the driving information of the other vehicle, and determine whether a collision is possible through comparison with a reference value.

At this time, according to an exemplary embodiment, when there is no driving information having location information corresponding to the position of another vehicle detected based on radar data among the received driving information, the processor 131 may detect the other vehicle based on the image data of the camera 110 and determine whether a collision with the other vehicle is possible.

That is, the processor 131 may determine whether the other vehicle is detected based on the image data when driving information cannot be received from the other vehicle detected based on radar data through V2V communication, and determine whether a collision with the other vehicle is possible based on at least one of radar data or image data of the other vehicle when the other vehicle is detected based on the image data.

In addition, according to an exemplary embodiment, when there is no image data corresponding to the other vehicle detected based on the radar data, that is, when the other vehicle is not detected based on the image data of the camera 110, the processor 131 may predict a driving path of the other vehicle based on at least one of previously acquired radar data or image data to determine whether a collision with the other vehicle is possible.

That is, the processor 131 may acquire previous driving information for the other vehicle based on at least one of previously acquired radar data or image data, predict the current driving information based on the previous driving information, and determine whether a collision with the other vehicle is possible afterwards based on the predicted current driving information.

The processor 131 according to an exemplary embodiment may warn the driver that there is a risk of collision due to a lane change, by transmitting a warning signal that controls the warning system 72 of the vehicle 1 to the vehicle 1 when a collision with the other vehicle is expected. In this case, the warning may be provided through sound through a speaker, an image through a display, a warning light, and the like, and may also be provided through vibration or reverse torque from the steering wheel.

In addition, according to an exemplary embodiment, when a collision with the other vehicle is expected, the processor 131 may prevent a collision that may occur due to a lane change by transmitting a steering signal for controlling the steering device 40 to the vehicle 1 so that the vehicle 1 maintains the current lane without changing lane.

The memory 132 may store a program and/or data for the processor 141 to process image data, a program and/or data for processing radar data, and a program and/or data for the processor 141 to generate a braking signal, a steering signal, and/or a warning signal.

The memory 132 temporarily stores image data received from the camera 110 and/or radar data received from the radar 120, and temporarily store a result of processing image data and/or radar data by the processor 131.

The memory 132 may include not only a volatile memory such as S-RAM and D-RAM, but also a non-volatile memory such as flash memory, read only memory (ROM), and erasable programmable read only memory (EPROM).

The driver assistance system 100 is not limited to the illustration in FIG. 2, and may further include a lidar that scans around the vehicle 1 and detects an object.

FIG. 4 is a view illustrating a case where a driver assistance system 100 according to an exemplary embodiment of the present disclosure detects another vehicle in a lane to be changed located in a rear side, FIG. 5 is a view illustrating a case where a driver assistance system 100 according to an exemplary embodiment of the present disclosure detects another vehicle in a lane to be changed located in the front side, FIG. 6 illustrates a case in which the driver assistance system 100 according to an exemplary embodiment of the present disclosure detects another vehicle in a lane next to a lane to be changed located in a rear side, FIG. 7 is a view illustrating a case in which the driver assistance system 100 according to an exemplary embodiment of the present disclosure detects another vehicle in a lane next to a lane to be changed located in the front side and FIG. 8 illustrates a case where the driver assistance system 100 according to an exemplary embodiment of the present disclosure detects another vehicle in a lane next to a lane to be changed.

Referring to FIGS. 4 to 8, the processor 131 may detect another vehicle located outside the vehicle 1 based on the radar data of the radar 120.

Specifically, when detecting an attempt to change lanes of the vehicle 1 through the steering angle of the steering device 40 or the operation of a direction indicator lamp, the processor 131 may detect the other vehicle on the side of the lane to be changed based on the radar data of the radar 120.

That is, when the vehicle 1 attempts to change lanes to the right, the processor 131 may detect the other vehicle located on the right side of the vehicle 1 based on radar data received from the first corner radar 131 and the third corner radar 133.

For example, as shown in FIGS. 4 and 5, the other vehicle may correspond to the other vehicle 2 located in the lane to be changed. In addition, as shown in FIGS. 6 and 7, the other vehicle may correspond to the other vehicle 3 located in a lane next to the lane to be changed.

The processor 131, after detecting the other vehicle through radar data, may determine whether a collision with the detected the other vehicles 2 and 3 is possible based on driving information received from the other vehicles 2 and 3 detected through the communication module of the vehicle 1.

Specifically, the processor 131 may determine driving information including position information corresponding to the position of the detected other vehicles 2 and 3 from among driving information received through the communication module, and determine whether a collision with the other vehicles 2 and 3 is possible based on the determined driving information.

In this case, the driving information may include at least one of speed information, acceleration information, steering information, direction indication lamp operation information, or location information.

That is, when receiving driving information corresponding to the other vehicles 2 and 3 detected based on radar data from the other vehicles, the processer 131 may calculate a time to collision (TTC) or a distance to collision (DTC) with the other vehicles 2 and 3 based on the driving information of the other vehicles 2 and 3, and determine whether a collision is possible through comparison with a reference value.

At this time, according to an exemplary embodiment, when there is no driving information having location information corresponding to the position of the other vehicles 2 and 3 detected based on the radar data among the received driving information, the processor 131 may detect the other vehicles 2 and 3 based on the image data of the camera 110 and determine whether a collision with the other vehicles 2 and 3 is possible.

That is, the processor 131 may determine whether the other vehicle is detected based on the image data when the processor 131 fails to receive driving information through V2V communication from the other vehicles 2 and 3 detected based on the radar data, and determine whether a collision with the other vehicles 2 and 3 is possible based on at least one of radar data or image data of the other vehicles 2 and 3 when the other vehicles 2 and 3 are detected based on the image data.

In addition, according to an exemplary embodiment, when there is no image data corresponding to the other vehicles 2 and 3 detected based on the radar data, that is, when the other vehicles 2 and 3 are not detected based on the image data of the camera 110, the processor 131 may predict the driving path of the other vehicles 2 and 3 based on at least one of previously acquired radar data or image data to determine whether a collision with the other vehicles 2 and 3 is possible.

That is, the processor 131 may acquire previous driving information for the other vehicles 2 and 3 based on at least one of previously acquired radar data or image data, predict current driving information based on the previous driving information, and determine whether a collision with other vehicles 2 and 3 is possible later based on the predicted current driving information.

The processor 131 according to an exemplary embodiment may warn the driver that there is a risk of collision due to a lane change by transmitting a warning signal for controlling the warning system of the vehicle 1 to the vehicle 1 when a collision with another vehicle (2, 3) is expected. In this case, the warning may be provided through sound through a speaker, an image through a display, a warning light, and the like, and may also be provided through vibration or reverse torque from the steering wheel.

In addition, according to an exemplary embodiment, when a collision with another vehicle is expected, the processor 13 may prevent a collision that may occur due to a lane change by transmitting a steering signal for controlling the steering device 40 to the vehicle 1 so that the vehicle 1 maintains the current lane without changing lane.

Specifically, as shown in FIG. 4, the processer 131, after detecting the other vehicle 2 located in the lane to be changed and located in the rear of the vehicle 1 based on the radar data, may determine whether a collision is possible by comparing the speed of the vehicle 1 with the speed of the other vehicle 2 based on driving information received from the other vehicle 2 and determine that a collision is expected and transmit at least one of a warning signal or a steering signal to the vehicle 1 when the speed of the other vehicle 2 is higher than the speed of the vehicle 1.

In addition, as shown in FIG. 5, the processor 131, after detecting the other vehicle 2 located in the lane to be changed and located in front of the vehicle 1 based on the radar data, may determine whether a collision is possible by comparing the speed of the vehicle 1 with the speed of the other vehicle 2 based on driving information received from the other vehicle 2, and determine that a collision is expected and transmit at least one of a warning signal or a steering signal to the vehicle 1 when the speed of the other vehicle 2 is lower than the speed of the vehicle 1.

In addition, as shown in FIG. 6, the processer 131, after detecting the other vehicle 3 located in the lane next to the target lane and located in the rear of the vehicle 1 based on the radar data, may determine whether a collision is possible by determining whether the other vehicle 3 accelerates and steers to the target lane based on the driving information received from the other vehicle 3, determine that a collision is expected when the other vehicle 3 accelerates and steers to a lane to be changed, and transmit at least one of a warning signal or a steering signal to the vehicle 1.

In addition, as shown in FIG. 7, the processer 131, after detecting the other vehicle 3 located in the lane next to the target lane and located in front of the vehicle 1 based on the radar data, may determine whether a collision is possible by determining whether the other vehicle 3 is decelerated and steered to the target lane based on the driving information received from the other vehicle 3, determine that a collision is expected when the other vehicle 3 decelerates and steers to a lane to be changed, and transmit at least one of a warning signal or a steering signal to the vehicle 1.

As shown in FIGS. 6 and 7, the driver assistance system 100 can prevent a collision with another vehicle 3 by receiving driving information through V2V communication from the other vehicle 3 and determining whether a collision with the other vehicle 3 is possible, even when the other vehicle 3 located in the lane next to the change target lane is hidden and invisible by the other vehicle 2 located in the change target lane.

In addition, as shown in FIG. 8, the processer 131, after detecting the other vehicle 3 located in the lane next to the lane to be changed and located on the side of the vehicle 1 based on the radar data, may determine whether a collision is possible by determining whether the other vehicle 3 is steering to the change target lane based on the driving information received from the other vehicle 3, determine that a collision is expected when the other vehicle 3 steers to a lane to be changed, and transmit at least one of a warning signal or a steering signal to the vehicle 1.

However, the processor 131 may determine whether a collision with the other vehicle 2 is possible by detecting the other vehicle 2 using the image data of the camera 110 when driving information from the other vehicle 2 is not received, and predict a driving path of the other vehicle 2 based on at least one of previously acquired radar data or image data to determine whether a collision with the other vehicle 2 is possible when the other vehicle 2 is not detected through the image data of the camera 110.

FIG. 9 is a view illustrating an operation of a driver assistance system 100 according to an exemplary embodiment of the present disclosure when a vehicle 1 is rotated. Referring to FIG. 9, when the vehicle 1 rotates simultaneously with the other vehicle 2, the other vehicle 2 may be detected by the radar 120, and the driver assistance system 100 may predict a collision with the other vehicle 2 by determining that the other vehicle 2 is steering to the vehicle 1, and accordingly, transmit a warning signal to the vehicle 1.

In this way, in order to prevent false alarms that may occur when the vehicle 1 and other vehicles 2 rotate at the same time, the driver assistance system 100 according to an exemplary embodiment may stop an operation of transmitting a warning signal to the vehicle 1 by detecting a situation in which the vehicle 1 and the other vehicle 2 rotate at the same time.

Specifically, the processor 131 according to an exemplary embodiment may determine whether the other vehicle 2 around the vehicle 2 rotates when the vehicle 1 rotates based on radar data, determine whether the direction indicator lamp of the other vehicle 2 around the vehicle 2 operates based on driving information received from the vehicle 2 when the other vehicle 2 rotates in the same direction as the vehicle 1, and stop transmitting the warning signal to the vehicle 1 when the direction indicator lamps of the other vehicles 2 operate.

Like this, when rotating at the same time (turn left or turn right), the driver assistance system 100 may identify the movement of other vehicles through the radar 120 to determine whether or not the vehicle rotates in the same direction as the vehicle 1, and minimize false alarms of the warning system 72 by receiving the operation information of the direction indicator lamps through V2V communication.

Hereinafter, a control method of the driver assistance system 100 according to an exemplary embodiment will be described. The driver assistance system 100 according to the above-described embodiment may be applied to a control method of the driver assistance system 100 described below. Accordingly, the contents described above with reference to FIGS. 1 to 9 are equally applicable to the control method of the driver assistance system 100 according to an exemplary embodiment even if not specifically mentioned.

FIG. 10a is a flowchart illustrating a case of assisting a lane change in a method of controlling a driver assistance system according to an exemplary embodiment of the present disclosure, and FIG. 10b is a portion of the flowchart shown in FIG. 10a.

Referring to FIG. 10a, the driver assistance system 100 may detect the other vehicles 2 and 3 on the side of the lane to be changed based on radar data (1010).

Specifically, when detecting an attempt to change lanes of the vehicle 1 through the steering angle of the steering device 40 or the operation of a direction indicator lamp, the processer 131 may detect the other vehicles 2 and 3 on the side of the lane to be changed based on the radar data of the radar 120.

That is, when the vehicle 1 attempts to change lanes to the right, the processor 131 may detect other vehicles 2 and 3 located on the right side of the vehicle 1 based on radar data received from the first corner radar 131 and the third corner radar 133. In this case, the other vehicles 2 and 3 may be other vehicles 2 located in the lane to be changed, or other vehicles 3 located in the lane next to the lane to be changed.

When driving information corresponding to the position of the other vehicles 2 and 3 exists among the received driving information (example of 1020), the driver assistance system 100 may determine whether a collision with other vehicles 2 and 3 is possible based on the driving information (1030).

In this case, the driving information may include at least one of speed information, acceleration information, steering information, direction indication lamp operation information, or location information.

That is, when receiving driving information corresponding to other vehicles 2 and 3 detected based on radar data from other vehicles, the processor 131 may calculate calculates an time to collision (TTC) or a distance to collision (DTC) with other vehicles 2 and 3 based on the driving information of the other vehicles 2 and 3, and determine whether a collision is possible through comparison with the reference value.

At this time, according to an exemplary embodiment, when driving information corresponding to the position of the other vehicles 2 and 3 does not exist (No in 1020), and image data corresponding to the other vehicles 2 and 3 exists (YES in 1040) among the received driving information, the driver assistance system 100 may determine whether a collision with other vehicles 2 and 3 is possible based on the image data (1050).

That is, the processor 131 may determine whether other vehicles 2 and 3 are detected based on the image data when driving information cannot be received from other vehicles 2 and 3 detected based on radar data through V2V communication, and may determine whether a collision with the other vehicles 2 and 3 is possible based on at least one of radar data or image data of the other vehicles 2 and 3 when the other vehicles 2 and 3 are detected based on the image data, the processor 131.

In addition, when the image data corresponding to the other vehicles 2 and 3 does not exist (No in 1040), that is, when the other vehicle is not detected based on the image data of the camera 110, the processor 131 according to an exemplary embodiment may predict a driving path of the other vehicles 2 and 3 based on at least one of previously acquired radar data or image data to determine whether a collision with another vehicle is possible (1060).

That is, the processor 131 may acquire previous driving information for the other vehicles 2 and 3 based on at least one of previously acquired radar data or image data, predict current driving information based on the previous driving information, and determine whether a collision with other vehicles 2 and 3 is possible later based on the predicted current driving information.

When a collision with the other vehicles 2 and 3 is expected (example of 1070), the driver assistance system 100 may transmit at least one of a warning signal for controlling the warning system 72 or a steering signal for controlling the steering device 40 to the vehicle 1 (1080).

That is, when a collision with the other vehicle 2 and 3 is expected, the processor 131 according to an exemplary embodiment may warn the driver that there is a risk of collision due to a lane change by transmitting a warning signal that controls the warning system 72 of the vehicle 1 to the vehicle 1.

In this case, the warning may be provided through sound through a speaker, an image through a display, a warning light, and the like, and may also be provided through vibration or reverse torque from the steering wheel.

In addition, according to an exemplary embodiment, when a collision with the other vehicles 2 and 3 is expected, the processor 131 may prevent a collision that may occur due to a lane change by transmitting a steering signal for controlling the steering device 40 to the vehicle 1 so that the vehicle 1 maintains the current lane without changing lane.

Meanwhile, the disclosed embodiments may be embodied in the form of a recording medium storing instructions executable by a computer. The instructions may be stored in the form of program code and, when executed by a processor, may generate a program module to perform the operations of the disclosed embodiments. The recording medium may be embodied as a computer-readable recording medium.

The computer-readable recording medium includes all kinds of recording media in which instructions which can be decoded by a computer are stored, for example, a Read Only Memory (ROM), a Random Access Memory (RAM), a magnetic tape, a magnetic disk, a flash memory, an optical data storage device, and the like.

Although exemplary embodiments of the present disclosure have been described for illustrative purposes, those skilled in the art will appreciate that various modifications, additions and substitutions are possible, without departing from the scope and spirit of the disclosure. Therefore, exemplary embodiments of the present disclosure have not been described for limiting purposes.

DESCRIPTION OF SYMBOLS

1: vehicle
10: driver assistance system
110: camera
120: radar
130: controller

What is claimed is:

1. An apparatus for assisting driving of a host vehicle, the apparatus comprising:
    at least one of an image sensor or a radar sensor mounted on the host vehicle and having a field of view outside of the host vehicle; and
    a controller communicatively connected to the at least one of the image sensor and the radar sensor and configured to detect another vehicle on a side of the lane to be changed based on radar data acquired by the radar sensor if an attempt to change a lane of the host vehicle is detected, determine whether a collision with the another vehicle is possible based on driving information received from the another vehicle through a communication module of the host vehicle, and transmit a warning signal for controlling a warning system of the host vehicle to the host vehicle in case of the collision with the another vehicle is expected,
    wherein the controller is configured to determine driving information having location information corresponding to a location of the another vehicle detected based on the radar data among the received driving information, and determines whether a collision with the another vehicle is possible based on the determined driving information, and
    the controller is configured to detect the another vehicle based on at least one of image data acquired by the image sensor and determines whether a collision with the another vehicle is possible if there is no driving information having location information corresponding to the location of the another vehicle detected based on the radar data among the received driving information.

2. The apparatus of claim 1, wherein if the collision with the another vehicle is expected, the controller is configured to transmit a steering signal for controlling a steering device of the host vehicle to maintain the host vehicle lane to the host vehicle.

3. The apparatus of claim 2, wherein the driving information of the another vehicle includes at least one of speed information, acceleration information, steering information, direction indication lamp operation information, or location information of the another vehicle.

4. The apparatus of claim 3, wherein the controller is configured to transmit at least one of the warning signal and the steering signal to the host vehicle if the speed of the another vehicle is higher than the speed of the host vehicle, based on the driving information received from the another vehicle located in the change target lane and located at the rear of the host vehicle.

5. The apparatus of claim 3, wherein the controller is configured to transmit at least one of the warning signal and the steering signal to the host vehicle if the speed of the another vehicle is lower than the speed of the host vehicle, based on the driving information received from the another vehicle located in the change target lane and located in front of the host vehicle.

6. The apparatus of claim 3, wherein the controller is configured to transmit at least one of the warning signal and the steering signal to the vehicle if the another vehicle accelerates and steers to the change target lane, based on the driving information received from the another vehicle located in a lane next to the change target lane and located at the rear of the host vehicle.

7. The apparatus of claim 3, wherein the controller is configured to transmit at least one of the warning signal and the steering signal to the host vehicle when the another vehicle is decelerated and steers to the change target lane, based on the driving information received from the another vehicle located in a lane next to the change target lane and located in front of the host vehicle.

8. The apparatus of claim 3, wherein the controller is configured to transmit at least one of the warning signal and the steering signal to the host vehicle if the another vehicle steers to the change target lane, based on the driving information received from the another vehicle located in a lane next to the change target lane and located on the side of the host vehicle.

9. The apparatus of claim 3, wherein the controller is configured to:
   determine whether another vehicle around the host vehicle rotates based on the radar data if the host vehicle rotates,
   determine whether a direction indicator lamp of the another vehicle around the host vehicle operates based on the driving information received from the host vehicle around the host vehicle if the another vehicle around the vehicle rotates in the same direction as the host vehicle, and
   stop an operation of transmitting the warning signal to the host vehicle if the direction indicator lamp of the another vehicle nearby operates.

10. The apparatus of claim 1, wherein the controller is configured to predict a driving path of the another vehicle and determine whether a collision with the another vehicle is possible based on at least one of previously acquired radar data or image data when the another vehicle is not detected, based on the image data.

11. A method for assisting driving of a host vehicle, the method comprises:
   detecting another vehicle on a side of a lane to be changed based on radar data acquired by a radar sensor when detecting an attempt to change a lane of the host vehicle;
   determining whether a collision with the another vehicle is possible based on driving information received from the another vehicle through a communication module of the host vehicle; and
   transmitting a warning signal for controlling a warning system of the host vehicle to the host vehicle if a collision with the another vehicle is expected,
   wherein the determining whether a collision with the another vehicle is possible comprises:
      determining driving information having location information corresponding to a location of the another vehicle detected based on the radar data among the received driving information, and determining whether a collision with the another vehicle is possible based on the determined driving information, and
      detecting the another vehicle based on at least one of image data acquired by the image sensor and determining whether a collision with the another vehicle is possible if there is no driving information having location information corresponding to the location of the another vehicle detected based on the radar data among the received driving information.

12. The method of claim 11, further comprising:
   transmitting a steering signal for controlling a steering device of the host vehicle to the host vehicle so that the host vehicle maintains a lane if a collision with the another vehicle is expected.

13. The method of claim 12, wherein the driving information of the another vehicle includes at least one of speed information, acceleration information, steering information, direction indication lamp operation information, or location information of the another vehicle.

14. The method of claim 13, further comprising: transmitting at least one of the warning signal and the steering signal to the vehicle if the speed of the another vehicle is higher than the speed of the host vehicle, based on the driving information received from the another vehicle located in the change target lane and located in the rear of the host vehicle.

15. The method of claim 13, further comprising: transmitting at least one of the warning signal and the steering signal to the host vehicle if the speed of the another vehicle is lower than the speed of the host vehicle, based on the driving information received from the another vehicle located in the change target lane and located in front of the host vehicle.

16. The method of claim 13, further comprising: transmitting at least one of the warning signal or the steering signal to the host vehicle if the another vehicle is accelerating and steering to the target lane, based on the driving information received from the another vehicle located in a lane next to the change target lane and located at the rear of the host vehicle.

17. The method of claim 13, further comprising: transmitting at least one of the warning signal and the steering signal to the host vehicle when the another vehicle is decelerating and steering to the target lane, based on the driving information received from the another vehicle located in a lane next to the change target lane and located in front of the host vehicle.

18. A non-transitory computer-readable medium storing computer-executable instructions when executed by a processor to perform:
   detecting another vehicle on a side of a lane to be changed based on radar data acquired by a radar when detecting an attempt to change a lane of a host vehicle;
   determining whether a collision with the another vehicle is possible based on driving information received from the another vehicle through a communication module of the host vehicle; and
   transmitting a warning signal for controlling a warning system of the host vehicle to the host vehicle when the collision with the another vehicle is expected,
   wherein the determining whether a collision with the another vehicle is possible comprises:
      determining driving information having location information corresponding to a location of the another vehicle detected based on the radar data among the received driving information, and determining whether a collision with the another vehicle is possible based on the determined driving information, and
      detecting the another vehicle based on at least one of image data acquired by the image sensor and determining whether a collision with the another vehicle is possible if there is no driving information having location information corresponding to the location of the another vehicle detected based on the radar data among the received driving information.

\* \* \* \* \*